United States Patent [19]

Blum

[11] Patent Number: 4,662,847

[45] Date of Patent: May 5, 1987

[54] ELECTRONIC DEVICE AND METHOD FOR THE TREATMENT OF STUTTERING

[76] Inventor: Arthur M. Blum, 1090 Butterfield Rd., San Anselmo, Calif. 94960

[21] Appl. No.: 803,129

[22] Filed: Nov. 29, 1985

[51] Int. Cl.⁴ ............................................. G09B 19/04
[52] U.S. Cl. .................................. 434/185; 128/1 R
[58] Field of Search ........................ 434/185; 128/1 R

[56] References Cited

U.S. PATENT DOCUMENTS

| | | | |
|---|---|---|---|
| 3,566,858 | 3/1971 | Larson | 434/185 |
| 4,143,648 | 3/1979 | Cohen et al. | 128/1 R |
| 4,421,488 | 4/1983 | Parlenui et al. | 434/185 |
| 4,464,119 | 8/1984 | Uildgrube et al. | 434/185 |

Primary Examiner—Leo P. Picard
Attorney, Agent, or Firm—Flehr, Hohbach, Test, Albritton & Herbert

[57] ABSTRACT

An improved electronic device and method for the treatment of stuttering is disclosed. The device and method provide for transmitting electronic speech signals from a user through two paths, one of which is synchronous and the other is asynchronous. The synchronous speech signal is transmitted while the user is normally speaking and, at any pause in phonation, the device switches to the asynchronous path and transmits speech in a delayed auditory feedback mode and continues to do so until a pre-selected change occurs in the user's speech.

6 Claims, 3 Drawing Figures

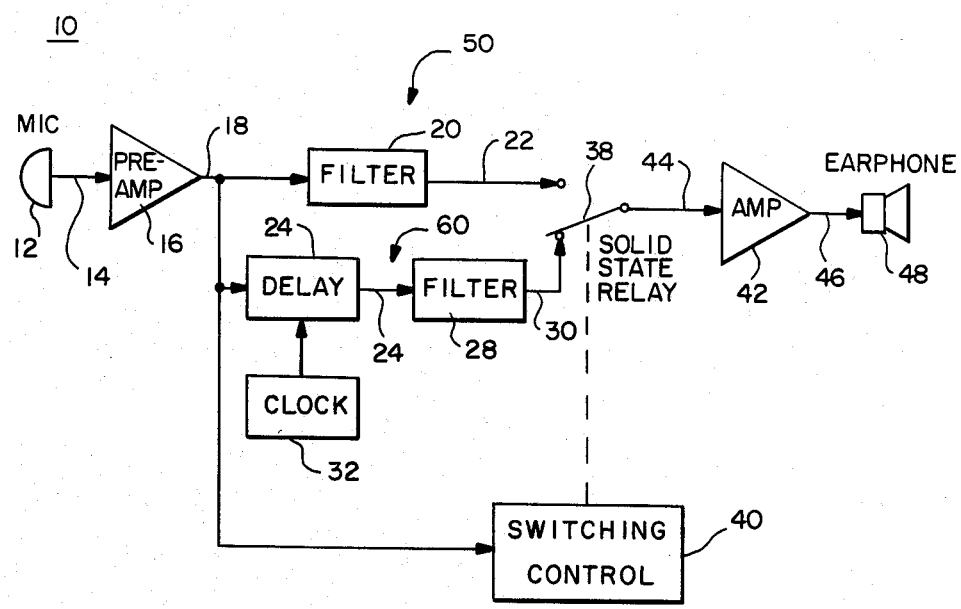
FIG.—1
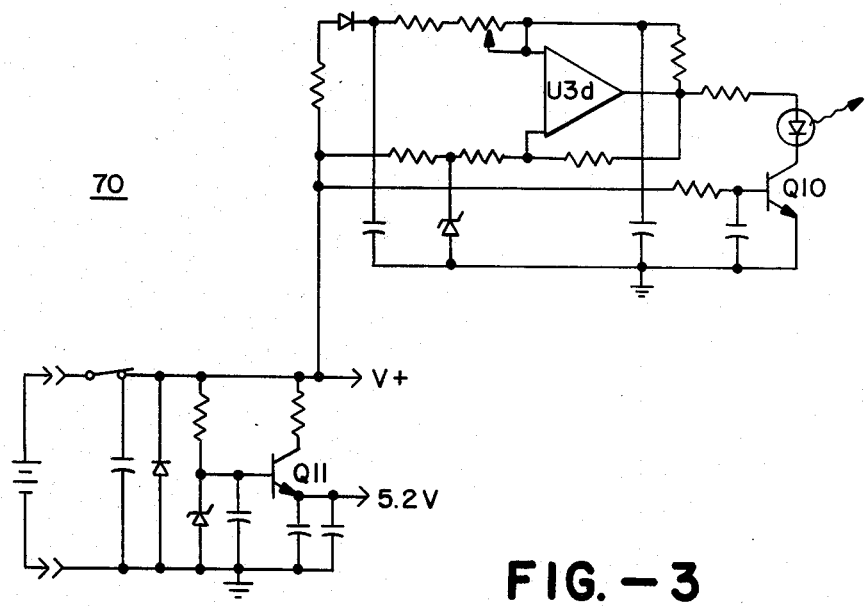
FIG.—3

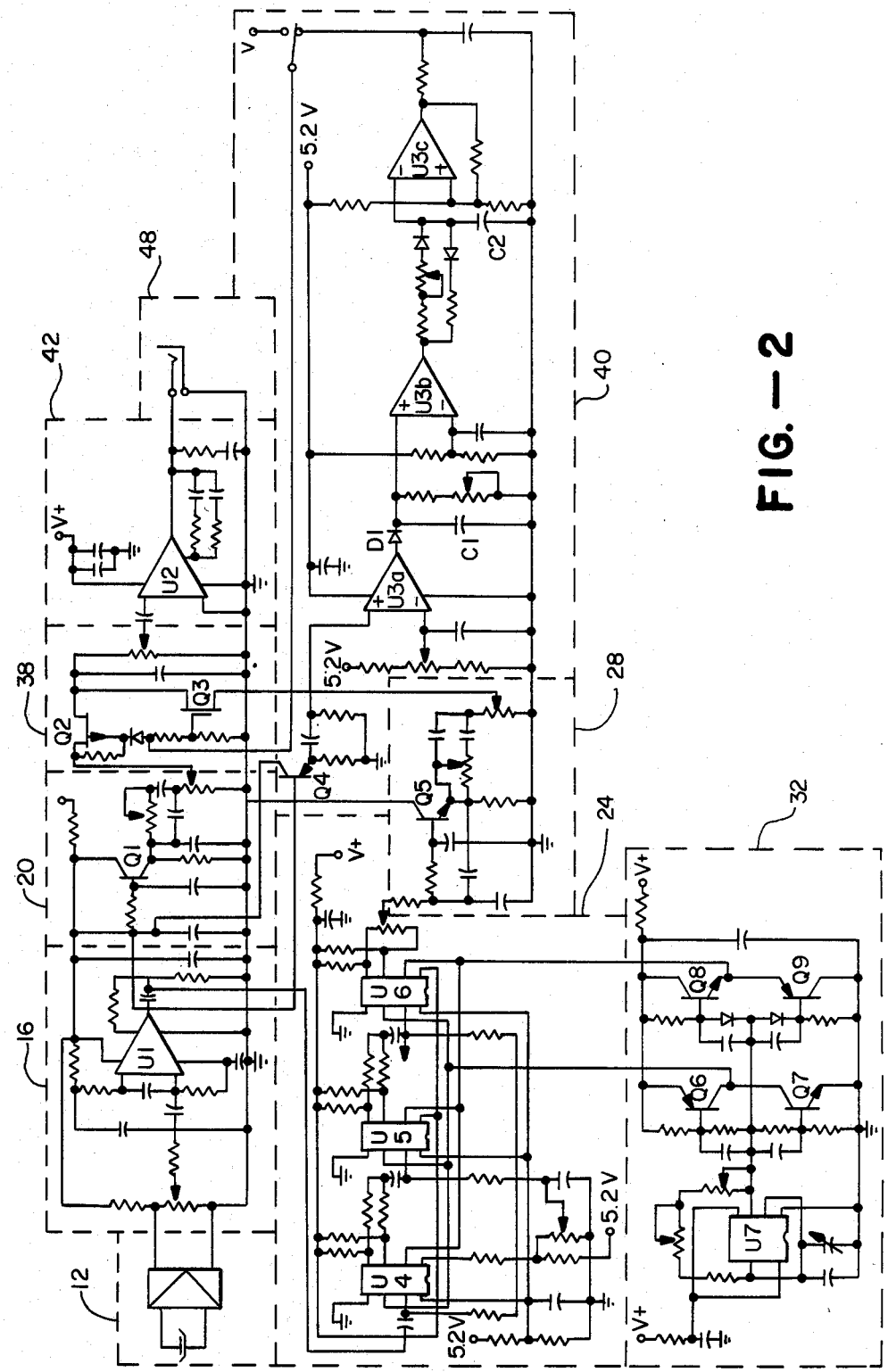
FIG.—2

ELECTRONIC DEVICE AND METHOD FOR THE TREATMENT OF STUTTERING

BACKGROUND OF THE INVENTION

The present invention relates to an electronic device and method for the treatment of stuttering.

Speech pathologists have long been concerned with the treatment of stuttering. Prior art devices utilize a concept known as delayed auditory feedback (DAF) to aid an individual suffering from stuttering. As an example, U.S. Pat. No. 4,421,488 shows a stuttering aid which includes a microphone, an amplifier, two earphones and two circuits connecting the earphones to an amplifier. One of the two circuits includes a delay unit and the amount of time delay is adjustable.

U.S. Pat. No. 4,464,119 describes a known DAF system for correcting speech. U.S. Pat. No. 3,566,858 shows a device which uses noise masking techniques to combat stuttering and includes a microphone which is selectively responsive to the patient's voice. U.S. Pat. No. 4,143,648 shows a speech therapy device which includes a patient responsive feedback circuit and time delay circuit to detect voice and speech levels.

While the prior art approaches described above are of some aid to the speech pathologist in the treatment of stuttering, there is a need for an improved electronic device and method for the treatment of stuttering.

SUMMARY OF THE INVENTION

It is an object of the present invention to provide an improved electronic device and method for the treatment of stuttering.

Briefly, the device and method employ a novel operating principle to produce a particular modification of the speech signal produced by a user of the device in the course of engaging in the act of speech and delivering that modified signal to the user's ear while speaking. During the period of time that phonation is occurring, the speech signal transmitted by the device is synchronous. At a pause in phonation greater than a measured interval, the device transmits the last portion of the most recently occurring phonation. Both the length of the pause and phonation required to change the signal, and the amount of the last portion of phonation inserted in the signal, are critical intervals that can be finely adjusted. The user of the device then continues to receive a delayed signal until continuous phonation occurs for a specified period of time. The user then receives a synchronous speech signal.

The electronic device achieves this operating principle by dividing the amplified electronic speech signal into two circuits, one of which passes through an electronic delay section. A sound actuated control circuit determines whether the output at any given moment comprises the synchronous signal or the delayed (asynchronous) signal. The presence of a signal in the synchronous circuit delivers it to an output earphone, and the absence of a signal causes the signal if still in the delay circuit to be delivered to the earphone. The device stays in the delayed signal mode so that all subsequent signals will be delayed until a length of phonation without pauses is detected. The switching between the two signal circuits is achieved without introducing any extraneous noise or changing the intensity level of the signal at the user's ear.

In view of the foregoing summary, the present invention achieves the objective of providing an improved electronic device and method for the treatment of stuttering.

Other objects and features of the present invention will become apparent from the following detailed description when taken in conjunction with the accompanying drawings.

BRIEF DESCRIPTION OF THE DRAWINGS

FIG. 1 depicts an improved electronic device for the treatment of stuttering.

FIG. 2 depicts a detailed schematic diagram of the present invention.

FIG. 3 depicts a schematic diagram of the power supply circuit of the present invention.

DETAILED DESCRIPTION OF THE DRAWINGS

Referring now to FIG. 1, a block diagram of an improved electronic device for the treatment of stuttering is depicted.

In FIG. 1, the device 10 includes a microphone 12 connected via lead 14 to a preamplifier circuit 16. Preamplifier 16 is in turn connected via lead 18 to filter 20, a delay circuit 24 and switching control circuit 40. Filter 20 is connected to a solid state relay 38 via lead 22. Solid state relay 38 is controlled by switching control circuit 40.

Delay circuit 24 is adjustable via a clock circuit 32 and provides an adjustable delayed auditory feedback signal to filter 28 via lead 26. Filter 28 can be connected to solid state relay 38 via lead 30.

The output from solid state relay 38 is connected via lead 44 to amplifier 42, which in turn is connected to earphone 48 via lead 46.

Filter 20 and lead 22 form a synchronous speech path 50 when solid relay 38 is connected to lead 22.

Similarly, delay 24, leads 26, 30 and filter 28 form an asynchronous voice path 60 to earphone 48 when solid state relay 38 is connected to lead 30.

A user who suffers from stuttering normally will use the device 10 such that the earphone 48 is normally placed in a user's ear (the present invention can utilize one or more earphones, depending on a user's desires or needs).

The user will speak into microphone 12 such that a low voltage audio signal from microphone 12 is generated and enters preamplifier circuit 16 via lead 14. The low voltage audio signal is amplified to a level more suitable for switching to the synchronous voice path 50 or the asynchronous voice path 60, as will be described in more detail.

In operation, the voice signal is transmitted through the synchronous voice path 50 through solid state relay 38 to amplifier 42 and finally to earphone 48. The user will be hearing at that time an amplified acoustic signal synchronously with respect to his own speech.

The speech signal is input into the delay or asynchronous voice path 60 and to switching control circuit 40, as indicated in FIG. 1.

The audio filter circuit 20 adjusts the tonal quality of the voice signal for passing to solid state relay 38 in normal operation.

A function of delay circuit 24 provides a delayed auditory feedback signal which can be adjusted to, in one embodiment, a delay which is from 50 to 400 milliseconds. A delayed signal from delay circuit 24 passes to audio filter circuit 28 and is connected to earphone 48 via connection of solid state relay 38 to lead 30. The signal from delay circuit 24 can be characterized as a delayed audio channel signal or asynchronous audio channel signal.

The third path of the speech signal is to the switching control circuit 40, which controls the switching of solid state relay 38. Switching control circuit 40 determines whether the synchronous signal on synchronous path 50 or delayed audio signal on delay path 60 is passed to audio amplifier 42 and on to earphone 48.

The decision to switch between the synchronous and delayed audio channels is based upon the speech patterns of a user. When a user first begins to speak, the delayed signal is passed to earphone 48. After the user has spoken for a given amount of time, as determined by the sustained setting, and has not had a silent interval greater than the setting of the trigger interval control, the switching control circuit 40 causes the synchronous channel 50 to engage (solid state relay 38 is connected to lead 22). Once the user has engaged the synchronous channel 50, the circuit will switch the solid state relay back to the delay channel 60 if the user pauses for a period of time which is greater than the trigger interval.

Referring now to FIG. 2, a schematic diagram of the present invention of FIG. 1 is depicted, where the basic circuit blocks of FIG. 1 are indicated with the same corresponding number in FIG. 2. The description of the present invention will now be described in more detail in conjunction with FIG. 2.

The low voltage audio signal from microphone 12 enters the preamplifier circuit 16 and is amplified to a level more suitable for the switching and delay circuitry of the present invention. A preamplifier chip U1 of circuit 16 is at the heart of this stage. The amplified signal is then fed into three separate circuits, the audio filter circuit 20, the delay circuit 24 and the switching control circuit 40, as previously described.

The audio filter circuit 20 is formed by transistor Q1, and as previously described, adjusts the tonal output of the signal for passing on to one of the two inputs to the solid state, singlepole, doublethrow relay 38, which includes transistors Q2 and Q3 of FIG. 2. As previously described, the output of audio filter circuit 20 from transistor Q1 is referred to as the synchronous audio channel 50.

The function of the delay circuit 24 of FIG. 1 is to provide the delayed auditory feedback signal, as previously described. The audio signal from chip U1 of circuit 16 passes through chip U4 and, depending upon the adjustable delay time, is passed to transistor Q5 of circuit 28. Chips U4, U5 and U6 are "bucket brigade" delay chips, which make possible adjustable delays of from 50 up to 400 milliseconds.

The adjustment of the delay circuit U4U6 is controlled by clock signals from circuit 32, which includes chip U7 and transistors Q6Q9. The delayed signal from chips U4U6 passes through the audio filter circuit 28 formed by transistor Q5. This signal passes to the second input of the solid state relay 38, formed by transistors Q2, Q3.

The time delay from delay circuit 24 of FIG. 2 is dependent upon the frequency of two square wave signals (CP1 and CP2) emanating from the clock circuit 32.

The heart of clock circuit 32 is chip U7, an astable multivibrator which oscillates at a frequency determined by the setting of the delay control. Transistors Q6 and Q7 act as an inverted buffer on chip U7's output, while transistors Q8 and Q9 act as a noninverting buffer. The clock circuit 32 thus outputs a twophase clock signal of varying frequency and of sufficient current in order to drive all three delay chips U4–U6 of circuit 24.

The third circuit fed by the preamplifier output signal is the switching control circuit 40 which, as previously described, controls the switching of the solid state relay. Switching control circuit 40 determines whether the synchronous or the delayed audio signal is passed to the audio amplifier U2 of FIG. 2. The decision is based on the presence or absence of phonation including time length.

The switching control circuit 40 of FIG. 2 comprises three major sections. The first section determines what sound level is indicative of speech, as opposed to background noise, as an example. The audio signal enters this stage into operational amplifier U3A. The "threshold" control determines what signal level must enter U3A in order to be recognized as speech. When a sufficiently high input signal is present, the output of U3A goes high. The output of U3A is passed to the input of the second section, U3B.

The second section of circuit 40 determines the length of time that the user must pause once the user has already enabled the synchronous channel 50 in order for the solid state relay 38 to switch back to the delay channel 60 again. When the output of U3A goes high, it immediately charges capacitor C1 and drives U3B's input high. This causes the output of U3B to go high as well.

If speech stops, the output of U3A goes low. However, because of diode D1, a low level output from U3A will not discharge C1. Capacitor C1 is only discharged at a rate determined by the setting of the trigger interval control. When capacitor C1 discharges to a certain fixed voltage, the output of U3B goes low.

The output of U3B is connected to the third section within the switching control circuit 40, utilizing U3C. This section determines how long the user must speak in order to activate the synchronous channel. When the user first begins to speak, the output of U3A immediately goes high, thus causing the output of U3B to immediately go high as well. When the output of U3B goes high or low, it charges or discharges capacitor C2, respectively.

The charge rate for capacitor C2 is determined by the setting of the "sustain" control. When capacitor C2's voltage has risen to a certain fixed level, the output of U3C will go low, thus causing the solid state switch to operate. When capacitor C2's voltage has risen to a certain fixed level, the output of U3C will go low, thus causing the solid state switch to operate. The sustain control therefore determines how long the subject must speak in order to sufficiently charge capacitor C2, thereby causing U3C's output to go low, thus switching from delayed to the synchronous audio channel.

While the solid state relay 38 has two inputs, one from the synchronous audio channel 50 and the other from the delayed channel 60, it only has one output. The signal from this output goes through volume control and from there to the input of the audio amplifier chip U2. The fully amplified signal from U2 is then passed to the user's earphones 48.

In order to maintain consistent signal levels and timing characteristics, some circuits in the present invention require a consistent power supply voltage. Because a battery's voltage decreases with time, it is unsuitable as a power supply for these circuits. For this reason, a simple emitter follower circuit 70 is depicted in FIG. 3, wherein transistor Q11 is employed. The circuit of FIG. 3 provides a continuous 5.2 volt supply as long as the battery carries a potential of at least 6.4 volts. The battery used is a 9 volt battery. Amplifier U3D of FIG. 3 is a low battery circuit. If the battery's voltage drops below 6.4 volts, the LED of FIG. 3 blinks, indicating need for a replacement.

While the present invention has been described in conjunction with an improved device and method for the treatment of stuttering, other embodiments of the present invention are of course possible. For example, the control of the switching between a synchronous and asynchronous channel can be accomplished entirely under software control rather than the hardware diagram depicted in FIGS. 1–2. Other variations can be utilized as well. Therefore the present invention should only be construed and interpreted in conjunction with the accompanying claims submitted herewith.

What is claimed is:

1. An electronic device for the treatment of stuttering comprising
   a microphone for generating speech signals corresponding to the speech of a user of the device,
   at least one earphone,
   a first synchronous voice path circuit for normally transmitting synchronous speech signals from said microphone to said earphone,
   a second delayed voice path circuit for transmitting delayed speech signals from said microphone to said earphone, and
   voice actuated switch means for switching between said synchronous voice path and said delayed voice path based upon characteristics of the speech of the user on a continuous basis.

2. A device as in claim 1 including means for adjusting the time sensitivity of said switch means.

3. A device as in claim 2 wherein the adjustable time delay of said delayed voice path is approximately between 50 and 400 milliseconds.

4. In an electronic device for the treatment of stuttering, the method comprising the steps of
   generating speech signals corresponding to the speech of a user of said device,
   transmitting synchronous speech signals over a first synchronous voice path from a microphone to at least one earphone,
   transmitting delayed voice signals from said microphone to said earphone over a second delayed voice path during pauses in the normal speech pattern of said user, and
   switching between said synchronous voice path and said delayed voice path during said pauses.

5. An electronic device for the treatment of stuttering comprising
   a microphone for generating speech signals corresponding to the speech of a user of said device,
   at least one earphone,
   means for transmitting synchronous speech signals from said microphone to said earphone,
   means for transmitting delayed speech signals from said microphone to said earphone during pauses in the normal speech pattern of said user.

6. A device as in claim 5 including
   a first synchronous voice path circuit for normally transmitting said synchronous speech signals from said microphone to said earphone,
   a second delayed voice path circuit for transmitting delayed voice signals from said microphone to said earphone, and
   voice actuated switch means for switching between said synchronous voice path and said delayed voice path.

* * * * *